No. 858,359. PATENTED JUNE 25, 1907.
A. N. EASTMAN.
SHEARS.
APPLICATION FILED NOV. 16, 1903. RENEWED JUNE 3, 1907.

WITNESSES:
M. J. Dodson.
J H Heuser.

INVENTOR.
Albert N. Eastman
BY
Harry Lea Dodson
ATTORNEY.

UNITED STATES PATENT OFFICE.

ALBERT N. EASTMAN, OF CHICAGO, ILLINOIS.

SHEARS.

No. 858,359.  Specification of Letters Patent.  Patented June 25, 1907.

Application filed November 16, 1903. Renewed June 3, 1907. Serial No. 377,049.

*To all whom it may concern:*

Be it known that I, ALBERT N. EASTMAN, a citizen of the United States, residing at Chicago, in the county of Cook and State of Illinois, have invented certain new and useful Improvements in Shears.

I am aware that there are several ways of accomplishing this result, the ones with which I am familiar having one or another reason which prevents their becoming a success commercially.

The object of my invention is to produce a shear the tension of whose blades can be adjusted before leaving the factory, and which will remain the same in use, and to provide a means whereby an equal tension will be exerted on each blade, and has for its further object to accomplish the above result without materially increasing the expense of producing the shears.

My invention consists of the new and novel features and combination of parts hereinafter described and claimed.

Figure 1:
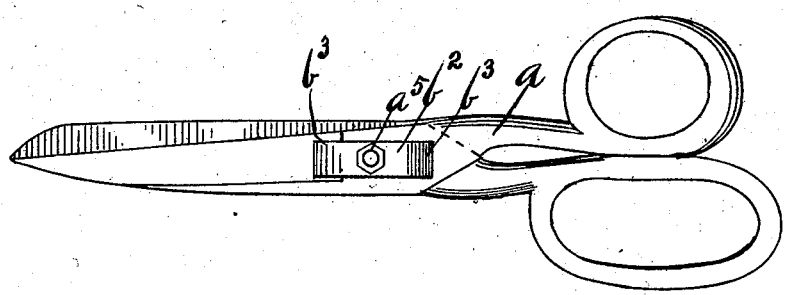
Figure 2:
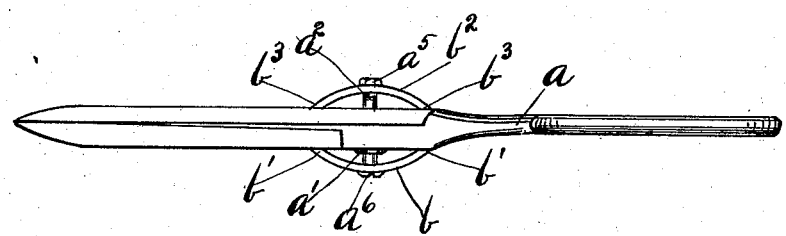
Figure 3:
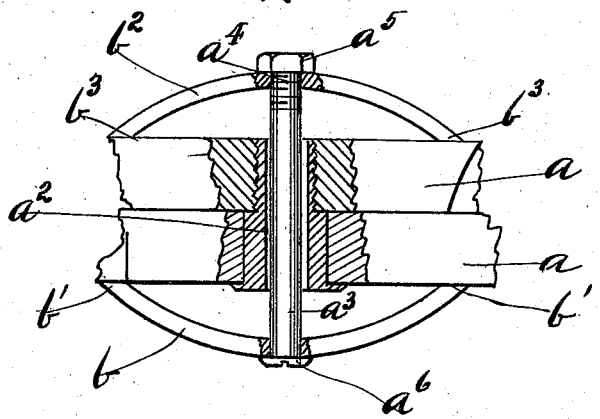

My method of accomplishing the foregoing objects may be more readily understood by having reference to the accompanying drawings, which are hereunto annexed, and which are a part of this specification, in which Figure 1 is a side view of a pair of shears with my improvement thereon. Fig. 2 is an edge view of the same. Fig 3 is an enlarged detail, partly in section, illustrating my device.

Similar letters refer to similar parts throughout the entire description.

In the drawings, $a$ is a pair of shears. $a^1$ is the pivot screw which holds the blades together. This screw is constructed with a passage or channel $a^2$ through its center. Mounted in this channel or passage $a^2$ is a pin $a^3$ having a head $a^6$ and a thread $a^4$ cut upon its end, and a nut $a^5$ mounted upon said thread, this pin being constructed of such diameter as to permit ample clearance between it and the sides of the channel or passage $a^2$, permitting it to turn freely with the movement of the shears. Mounted upon the pin $a^3$ between the head of the pivot screw $a^1$ and the head $a^6$ of the pin $a^3$ is a flat bow spring $b$, its ends $b^1$ bearing against the side of the blade of the shears. A similar spring $b^2$ is mounted at the opposite side of the shears between the nut $a^5$ and the threaded end of the pivot screw $a^1$, its ends $b^3$ bearing on the side of this blade of the shears. By turning the nut $a^5$ upon the pin $a^3$ the tension of these two springs $b$ and $b^2$ can be regulated with extreme nicety. The nut can then be locked by slightly riveting the end of the pin $a^3$ so as to prevent the tension of the springs being altered after the shears leave the factory.

It will be seen that the flat springs $b$ and $b^2$, and the pin $a^3$, are the only additions which it is necessary to add to the ordinary pair of shears in order to furnish a shear which will at all times maintain a constant and equal tension, and produce a shear cut by the action of the blades one upon another.

Having described my invention, what I regard as new and desire to secure by Letters Patent is:

1. In combination with a pair of shears, the pivot screw of which has a circular hole or channel through its center, a pin mounted in said channel, having a head at one end and a thread cut upon its other end, a nut mounted upon said thread, two flat springs formed in a bow having an opening at the center of the bow, mounted upon the said pin at each side of the shears, the ends of the bows bearing against the sides of the shears, for the purpose set forth substantially as described.

2. In combination with a pair of shears, a hollow pivot screw, two flat springs formed in the shape of a bow, having a hole at the center of the bow, mounted upon a pin which passes through the hollow pivot screw, the ends of said bows bearing against the sides of the shears, means to adjust the tension of said bow springs, for the purpose set forth substantially as described.

3. In combination with a pair of shears, a hollow pivot screw, spring actuated means exerting an equal pressure upon both sides of the shears said means being mounted on a pin passing through said hollow pivot screw for the purpose set forth substantially as described.

4. In combination with a pair of shears, a hollow pivot screw, spring actuated means mounted upon a pin passing through said hollow pivot screw exerting an equal pressure upon both sides of the shears, means to adjust the tension of said springs, for the purpose set forth substantially as described.

5. In combination with a pair of shears, a hollow pivot screw, a pin passing through said hollow pivot screw spring actuated means mounted upon said pin exerting an equal pressure upon both sides of the shears, means to adjust the tension of said springs, means to make said adjustment permanent, for the purpose set forth substantially as described.

6. In combination with a pair of shears, a hollow pivot screw, two flat springs formed in the shape of a bow, having a hole at the center of the bow, mounted upon a pin which passes through the hollow pivot screw, the ends of said bows bearing against the sides of the shears, means to adjust the tension of said bow springs, means to lock said adjustment when made, for the purpose set forth substantially as described.

7. In combination with a pair of shears, the pivot screw of which has a circular hole or channel through its center, a pin mounted in said channel, having a head at one end and a thread cut upon its other end, a nut mounted upon said thread, a flat spring formed in a bow having an opening at the center of the bow, mounted upon the said pin of the shears, the ends of the bow bearing against the side of the shears, for the purpose set forth substantially as described.

8. In combination with a pair of shears, a hollow pivot screw, a flat spring formed in the shape of a bow, having a hole at the center of the bow, mounted upon a pin which passes through the hollow pivot screw, the ends of said bow bearing against the side of the shears, means to adjust the tension of said bow spring, for the purpose set forth substantially as described.

9. In combination with a pair of shears, a hollow pivot screw, a flat spring formed in the shape of a bow, having a hole at the center of the bow, mounted upon a pin which passes through the hollow pivot screw, the ends of said bow bearing against the side of the shears, means to adjust the tension of said bow spring, and means to lock said adjustment when made, for the purpose set forth substantially as described.

In testimony whereof, I have signed my name to this specification in the presence of two subscribing witnesses.

ALBERT N. EASTMAN.

Witnesses:
H. A. EASTMAN,
EDWARD G. EASTMAN.